United States Patent [19]

Russell et al.

[11] 3,927,663

[45] Dec. 23, 1975

[54] METHOD AND APPARATUS FOR DETECTING CARDIAC ARRHYTHMIAS

[75] Inventors: Robert H. Russell, Pasadena; Allan L. Wolff, San Marino, both of Calif.

[73] Assignee: Phsiological Electronics Corporation, San Marino, Calif.

[22] Filed: May 2, 1974

[21] Appl. No.: 466,317

[52] U.S. Cl. .............................................. 128/2.06 A

[51] Int. Cl.$^{2}$ ............................................ A61B 5/04

[58] Field of Search...... 128/2.06 A, 2.06 B, 2.06 F, 128/2.06 R

[56] References Cited

UNITED STATES PATENTS

| | | | |
|---|---|---|---|
| 3,552,386 | 1/1971 | Horth | 128/2.06 A |
| 3,572,324 | 3/1971 | Petersen | 128/2.06 B |
| 3,590,811 | 7/1971 | Harris | 128/2.06 R |
| 3,828,768 | 8/1974 | Douglas | 128/2.06 A |

*Primary Examiner*—William E. Kamm

*Attorney, Agent, or Firm*—Nilsson, Robbins, Bissell, Dalgarn & Berliner

[57] ABSTRACT

A ventricular arrhythmia (or abnormal ventricular complex) monitoring technique for automatically generating an output in response to elevated low frequency content in the QRS portion of an incoming ECG wave, which is indicative of cardiac abnormalities, is improved by the addition of artifact noise detectors that temporarily interrupt the output in response to higher frequency muscle tremor and electrical interferences and to broad band, high amplitude noise and sudden baseline variations in the signal. The amplitude of the incoming ECG wave is normalized through an automatic gain control (AGC) input amplifier that receives variable gain control signals generated in accordance with the amplitude of prior QRS complexes. The variable gain control signals provide selectively variable threshold reference levels that are compared against output levels from the various detectors so that their sensitivity is automatically adjusted to match the available signal level.

21 Claims, 2 Drawing Figures

METHOD AND APPARATUS FOR DETECTING CARDIAC ARRHYTHMIAS

BACKGROUND OF THE INVENTION

A novel method and system for automatically detecting potentially dangerous ventricular arrhythmias was disclosed in the co-pending application of David W. Douglas, Ser. No. 271,373, filed July 13, 1972, entitled "METHOD AND APPARATUS FOR DETECTING CARDIAC ARRHYTHMIAS," now U.S. Pat. No. 3,828,768 and assigned to the assignee of this application. By this means, an incoming ECG wave is filtered to detect the characteristic frequency of the QRS complex during each heartbeat. The energy content of low frequency components are integrated during the QRS interval and compared against a fixed reference. If excessive low frequency content, an abnormal ventricular complex is signaled.

When patient ECG's are continuously monitored in a coronary care unit, such monitoring systems are subjected to various types of extraneous artifact noise signals that may distort or interfere with the ECG waves to produce erroneous indications of ventricular abnormalities. For example, a mere shift in the patient's body position can significantly change the amplitude and shape of the ECG wave. Likewise, the gradual degradation or loss of electrode contact reduces the available ECG signal or can cause a sudden shift in the signal baseline. Muscle activity by the patient produces characteristic tremor signals that are picked up by the electrodes, and electrical noise from power sources can cause interference. Such artifacts can distort the normal amplitude and frequency content of the ECG wave tending to produce false detection of ventricular abnormalities with resulting false alarms from the monitoring system.

Obviously, coronary care units and their personnel can operate with greater efficiency by minimizing unnecessary effort in responding to false alarms. In fact, a monitoring system might even hinder proper medical care if the attending staff is diverted by frequent false indications of heartbeat abnormalities caused by nothing more serious than a patient's normal movements. Therefore, an effective system should be capable of discriminating between common artifact noise effects and the actual ECG wave patterns, and with the system designed to positively identify and eliminate false responses due to artifacts, sensitivity to actual ventricular arrhythmia patterns can be enhanced.

REFERENCE TO PRIOR ART

Besides the aforementioned co-pending application Ser. No. 271,373, two items of pertinent prior art referenced therein are U.S. Pat. No. 3,138,151 entitled "DETECTOR AND ALARM VENTRICULAR IMPULSES," issued June 23, 1964, and German Pat. No. 2,109,179, issued Oct. 14, 1971, which relates to ECG wave analysis by comparison of high and low frequency band energy levels.

SUMMARY OF THE INVENTION

The improved method and system of this invention employs the basic QRS and ventricular arrhythmia detection techniques of the monitor disclosed in the aforementioned copending application, wherein the initiation of QRS complex in the incoming ECG signal is detected through a band pass filter responsive to characteristic frequencies in the range of approximately 10 to 18 Hertz. Detection of the QRS complex initiates a gate pulse of fixed duration during which the total low frequency signal energy below about 10 Hertz transferred through a low pass filter and a full wave rectifier circuit is integrated. If the integrated low frequency content in the QRS complex exceeds the existing threshold reference level applied to a comparator, an output signal indicative of a ventricular arrhythmia is generated to indicate the abnormal complex.

In the present invention, the basic prior detection technique is improved using an automatic gain control (AGC) to regulate the amplitude of the ECG signal supplied to the band pass and low pass filters used in detecting the QRS complexes and abnormal ventricular complexes. In particular, a peak follower circuit receives each rectified QRS wave passed by the QRS filter circuit to establish a variable threshold reference output level that declines gradually during the interval following a QRS detection. Also the peak follower output is damped to limit sudden large increases due to noise spikes. This variable threshold reference level is compared with subsequent QRS detector outputs and with the integrated low frequency output of the ventricular abnormality (VA) detector, thus matching the detector sensitivity with the available signal amplitude.

In addition, the invention also employs separate detectors responsive to certain types of artifact noise to temporarily interrupt outputs indicative of ventricular arrhythmias, thus preventing false VA indications due to such noise. In one case, higher frequency artifacts exceeding about 25 Hertz, such as tremor signals resulting from normal muscle activities by a patient or electrical power interference, are sensed through a high pass filter to be integrated during intervals between QRS detections. The integrated high frequency energy content is compared against a mean reference level signal derived from passing the peak follower output through a low pass smoothing filter having a relatively long rise time but having a fast fall time to follow sudden losses of ECG signal levels. This mean reference level signal is also used to control the automatic gain control (AGC) input amplifier to normalize the ECG signal supplied to the detectors. In addition, high amplitude artifact noise signals and sudden shifts in the signal baseline, sometimes referred to as a "wild swing," are detected by continuously comparing a selectively attenuated proportion of the normalized ECG signals with the mean reference level to generate a standby output that temporarily interrupts VA output signals whenever this level is exceeded. Use of automatic gain control to normalize the signal allows operation without adjustment over wider than normal ECG level extremes, and insures that the designed characteristics of the instrument remain consistent and unaffected by non-linearities that otherwise might degrade performance. In addition, use of the damped peak follower circuit, coupled with positive detection of artifact noise, plus confining the integration interval of the VA detector to respond only during the most significant portion of the QRS complex, improves overall action of the system. Opportunity for artifact occurrences during the critical VA sampling interval are reduced, thus improving the overall detector signal-to-noise ratio.

DETAILED DESCRIPTION

Figure 1:
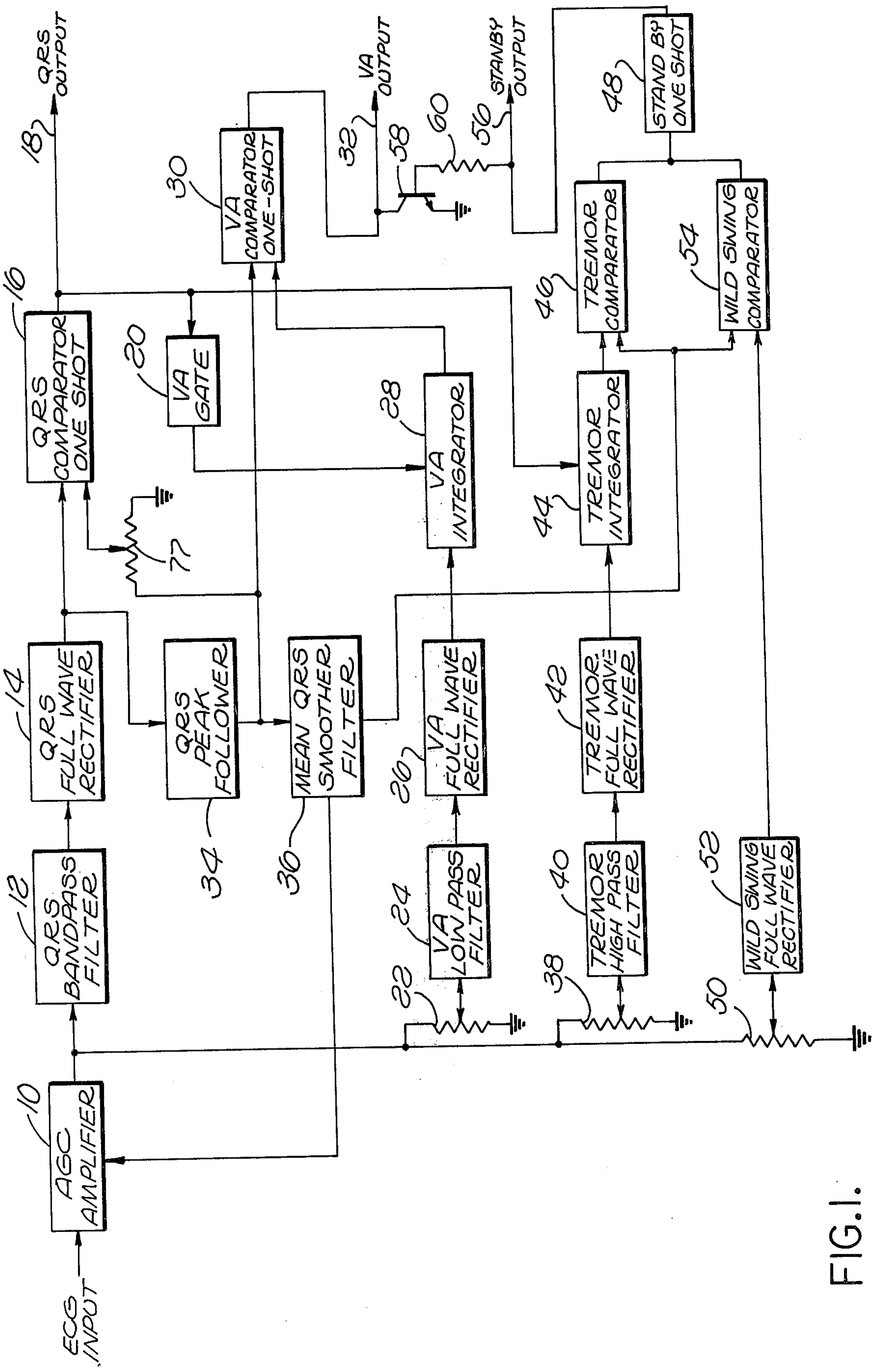
FIG. 1 is a schematic block diagram illustrating the circuit elements of the preferred embodiment of a system in accordance with the invention; and, FIG. 2 is a detailed circuit diagram illustrating special operational features of selected circuit elements involved in normalizing the ECG signal amplitude and providing the variable threshold reference levels used for adjusting detector sensitivity.

Referring now to FIG. 1, the ECG wave input signal is received by an automatic gain control (AGC) amplifier 10 wherein the amplitude of the output is normalized, as hereinafter described in more detail, to be supplied to the detector circuitry at approximately 1 volt plus and minus. This normalized ECG signal is delivered to the various detector arrangements that operate to sense the identifying wave characteristics of the QRS complex, ventricular arrhythmia patterns and common artifact noises.

Briefly, the incoming ECG wave is obtained from two or more pickup electrodes attached to the patient to lie along a selected heart axis and is usually preamplified for transmission to a remote monitoring site, such as a central nurses' station in a coronary care unit of a hospital, containing individual monitor displays for each patient.

In detecting the onset of each QRS complex, the normalized ECG signal from the AGC amplifier 10 is applied to a QRS band pass filter 12, such as described in the aforementioned prior application, with suitable high and low frequency filter sections using conventional operational amplifier arrangements. The resulting pass band has its peak output response at about 14 Hertz and extends between about 10 to 20 Hertz to span those frequencies characteristic of both the normal or abnormal QRS complex. A QRS full wave rectifier 14 operates to invert the negative going portions of the QRS wave passed by the QRS filter 12 to be applied to a QRS comparator one-shot 16. As soon as the filtered QRS signal level exceeds that of a threshold reference applied to the other input of a comparator circuit, the resulting output signal triggers a one-shot multivibrator to produce a QRS output pulse preferably of about 240 milliseconds duration.

This QRS output pulse is supplied to a QRS output terminal 18 to actuate an appropriate indicator light or the like, and also actuates a VA gate circuit 20 which, following a brief input delay of about 50 milliseconds, triggers a conventional one-shot multivibrator circuit to generate a VA gate pulse of around 150 milliseconds duration. The slightly delayed and shorter VA gate pulse interval, as compared to the immediate 250 millisecond VA gating pulse of the prior system, restricts the VA detection interval to the latter portion of the QRS wave where abnormal low frequency components characteristic of arrhythmia patterns tend to be most prevalent, thus enhancing the signal-to-noise ratio in the VA detection while minimizing the opportunity for artifact interference during the detection interval. Also, the brief delay permits effective interruption of false VA detection indications resulting from artifacts, as hereinafter described, by allowing sufficient time for the artifact detection circuitry to respond.

The normalized ECG signal from the AGC amplifier 10 is applied to the VA detection circuitry through a potentiometer 22 that preferably may be a multiposition step switch having discrete settings for selectively attenuating the applied signal. In practice, the step switch potentiometer 22 is set by first selecting the highest setting to supply maximum signal amplitude to the VA detector circuitry. The actual ECG signal is observed on an oscilloscope to see if the detection circuitry produces false VA indications. If so, the signal level to the detection circuitry is gradually reduced by moving the step switch to the next lower setting until false VA detections no longer occur. In most cases, best results are obtained by choosing a final setting just below that. Thus, the step switch potentiometer 22 is set to accommodate the normal ECG characteristics of each particular patient and changes in electrode position to insure an appropriate VA detection sensitivity.

As described in connection with the prior system, the VA detection circuitry includes a VA low pass filter 24 and full wave rectifier 26. Low frequency components in the attenuated ECG signal obtained from the conduction switch potentiometer 22 are transmitted through the VA low pass filter 24 that has a cutoff frequency of approximately 10 Hertz. The VA full wave rectifier operates to invert the positive going portions of these low frequency components that appear as the positive going signals at the output of a VA integrator 28 that uses a conventional operational amplifier arrangement with negative capacitive feedback. A switching element maintains a short circuit across the feedback capacitor that is opened to initiate the integrating operation only upon receipt of the VA gating pulse from the VA gate circuit 20. Upon cessation of the VA gating pulse, the short circuit is again established across the feedback capacitor, thus discharging the VA integrator 28 until detection of the next QRS complex.

The low frequency energy content accumulated during the Va pulse interval is applied to one input of a VA comparator one-shot 30 to be compared with the existing threshold reference level that, as previously mentioned, is also used in attenuated form with the QRS comparator 16. When the output level of the VA integrator 28 exceeds this variable threshold level, the comparator circuit produces an output signal to actuate a one-shot multivibrator arrangement to generate a VA output pulse of approximately 240 milliseconds duration to be applied to a VA output terminal 32, which is coupled to a monitor display unit (not shown) to actuate an indicator light or otherwise register the occurrence of a ventricular abnormality.

The basic circuitry and signal analysis techniques involved in the QRS and Va detection operations have already been explained in the aforementioned co-pending application, so that further details need not be repeated herein. However, the effectiveness and accuracy of these detection operations are notably enhanced by supplying automatically adjustable threshold reference levels to the QRS and VA comparator one-shots 16 and 30, instead of using preset threshold reference voltages as in the prior system. For this purpose, the full wave representation of the QRS complex obtained from the output of the QRS full wave rectifier 14 is applied through a QRS peak follower circuit 34 where the output voltage is established to correspond to the peak amplitude of the detected QRS wave that usually corresponds to the R portion of the complex. This maximum voltage is stored to be slowly discharged during the interval between successive QRS detections so that the peak level is reestablished on each successive heartbeat cycle, as more fully explained hereinafter with reference to FIG. 2. Sudden large increases in the peak follower output, such as might result from an intermittent noise spike, are limited so as to minimize any protracted loss of detection sensitivity during the time required to dissipate a high level peak follower output as a result of such noise. Normally, the threshold reference voltage from the QRS peak follower 34 at the beginning of each QRS complex in the incoming AGC wave is only slightly below the peak level established by the preceding QRS wave, and is restored to its previous maximum during each QRS detection.

A resistance-capacitance circuit, which includes a diode shunting the resistance element, operates as a mean QRS smoother filter 36 to flatten the periodic sawtooth signal pattern generated at the output of the QRS peak follower 34 in restoring the maximum output level on each QRS detection. The smoothed output from the mean QRS smoother filter 36 controls the variable gain element in the AGC amplifier 10 to normalize the amplitude of the ECG signal delivered to the detector, and is also applied as a separate means threshold reference level to be employed in the artifact detection circuit, as hereinafter described. The diode shunt permits the output of the mean QRS smoother filter 36 to follow more rapidly decreases in the QRS signal amplitude such as when shifts in the patient's body position cause reorientation of the heart relative to the electrode placement. By this means, the gain of the AGC amplifier 10 can be quickly increased to restore the amplitude of the normalized ECG signal while also providing a corresponding increase in the sensitivity of the artifact detector circuitry.

A trim potentiometer 38 is set to deliver the normalized ECG signal from the output of the AGC amplifier 10 at a selectively attenuated amplitude to a tremor high pass filter 40 that supplies signal frequencies above about 25 Hertz to a tremor full wave rectifier 42. A tremor integrator 44 using the conventional operational amplifier with negative capacitive feedback accumulates the total high frequency energy content occurring between QRS detections. This is accomplished by applying the QRS pulse from the QRS comparator one-short 16 to close a transistor switch that discharges the feedback capacitor restoring the integrator output to its initial zero signal condition. If the high frequency energy content of the incoming AGC signal causes the integrator output to exceed the mean threshold reference level obtained from the mean QRS smoother filter 36, a tremor comparator 46 generates an amplified output to actuate a standby one-shot multivibrator 48.

Similarly, another trim potentiometer 50 delivers a selectively attenuated ECG signal to a wild swing full wave rectifier 52 that simply inverts negative going portions of the signal to be applied to a wild swing comparator 54. If the reduced amplitude of the ECG signal at its normalized level exceeds the mean reference threshold, the amplifier circuit of the wild swing comparator 54 produces an output signal that would also serve to actuate the standby one-shot multivibrator 48. In this regard, the trim potentiometer 50 is set to deliver only a relatively low proportion of the normalized ECG signal to the wild swing detector circuitry so that only unusually large signal components, such as intermittent noise spikes or radical shifts in the baseline, will exceed the established reference threshold to actuate the wild swing comparator 54.

The particular setting of the tremor and wild swing trim potentiometer 38 and 50 should be made in accordance with the particular ambient patient conditions that commonly give rise to such artifacts. For example, with a particularly active patient, the operator may desire to set the trim potentiometer 38 at its lowest position so that the tremor detector response is completely eliminated, or this may be necessary where electrical power line interference at 60 Hertz is unusually strong and frequent. Once the standby one-shot 48 is actuated by signals either from the tremor comparator 46 or the wild swing comparator 54, it generates a fixed duration standby output pulse to be applied to a standby output terminal 56, where it may be further coupled to a monitor display unit (not shown) to actuate a signal light or other indicator to show the existence of a standby condition caused by artifact. This standby output pulse typically has a duration of approximately two seconds and is applied to actuate a switch, in this case a switching transistor 58, to ground the output of the VA comparator one-shot 30 to prevent any false VA output indications from reaching the VA output terminal 32, thereby preventing any false alarms from the monitor display unit due to false VA indications caused by artifact. The selected two second standby interval is usually sufficient to permit the system to stabilize after the disappearance of the interfering artifacts.

Figure 2:
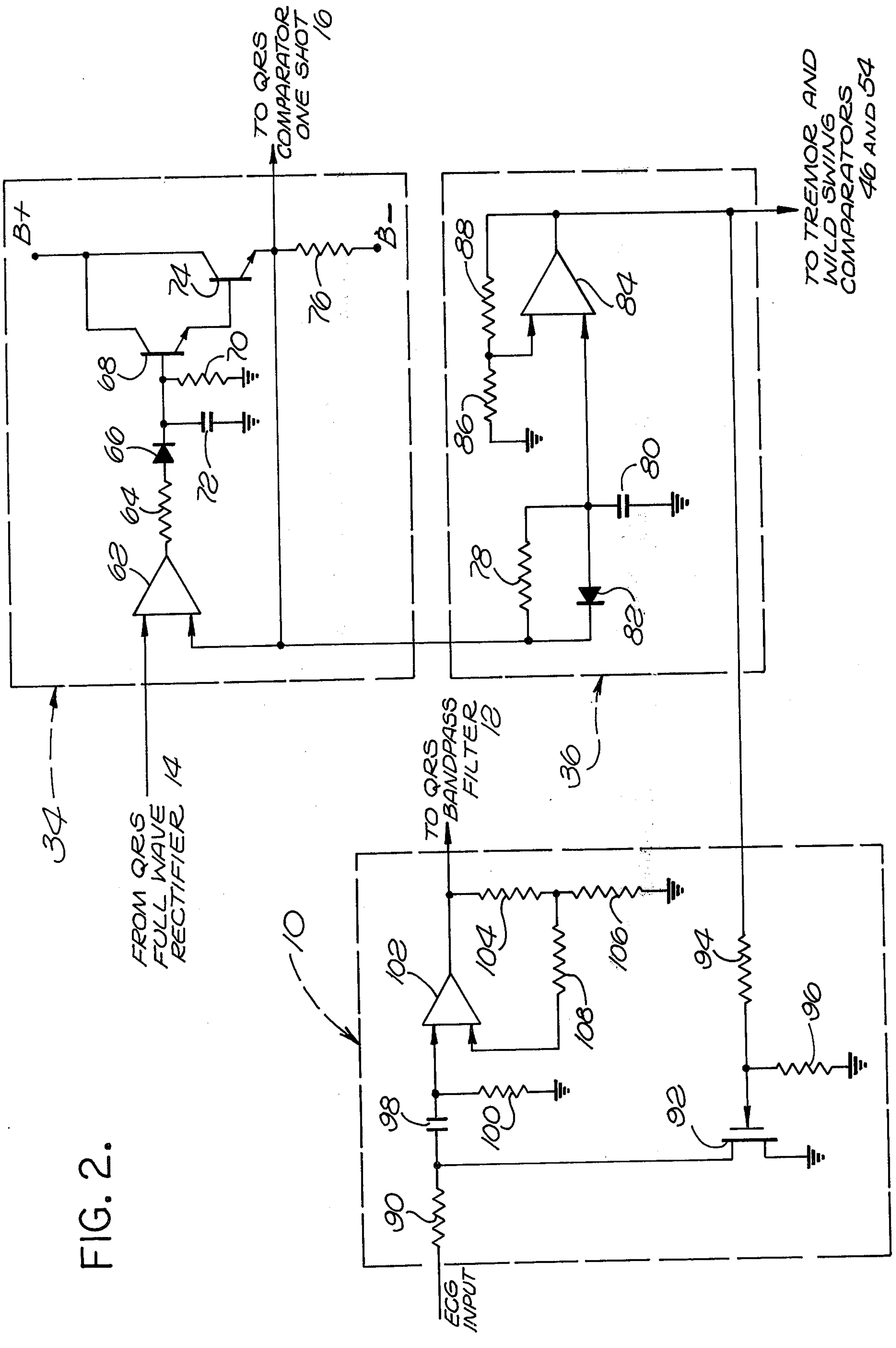

Referring now to FIG. 2, the details of the preferred form of the circuits to be used in accomplishing the previously explained special functions of the QRS peak follower 34, the mean QRS smoother filter 36 and the AGC amplifier 10 will assist in a complete understanding of the invention. As shown, the output from the QRs full wave rectifier 14 is applied to one input of a conventional amplifier 62, the output of which is coupled through a resistor 64 and a forward connected diode 66 to the base of a transistor 68. The base of the transistor 68 is coupled through an input resistor 70 to ground in parallel with a storage capacitor 72. Typically, the storage capacitor 72 is 2.2 microfarads with the input resistor having a value of about 4.7 megohms that permits only very slow discharge of the voltage across the capacitor 72. The emitter of transistor 68 is coupled directly to the base of another transistor 74, both of which have their collectors coupled to the B+ of an internal power supply (not shown), to form a Darlington pair. The emitter of the transistor 74 is connected through an output resistor 76 to the B− of the internal power supply and also to the other input of the amplifier 62. Accordingly, whenever the amplitude of the input signal from the QRS full wave rectifier 14 exceeds that of the voltage being fed back to the other input terminal from the emitter of the transistor 74, the amplifier 62 produces a positive output signal to supply an additional positive charge through the forward connected diode 66 to raise the voltage stored on the capacitor 72, which thereafter slowly declines by discharge through the resistor 70. The output resistor 64 is selected, typically at 220 kilohms, to limit the amount of charge supplied to the storage capacitor 72, so that its voltage does not increase unduly due to an abnormally high level voltage spike. As previously mentioned, the output voltage of this peak follower arrangement developed at the emitter of the transistor 74 is supplied to the QRS comparator one-shot as a threshold reference level. A QRS trim potentiometer 77, as shown in FIG. 1, can be used to set this threshold reference level at a desired percentage, typically 60 percent, so that the QRS output pulse is produced whenever the maximum amplitude of the detected QRS complex exceeds that. This is done because, even under normal circumstances, the maximum amplitude of one QRS complex may be somewhat lower than the preceding ones. The slow discharge of the storage capacitor 72 has the effect of gradually lowering the threshold reference in the absence of a QRS detection, thus gradually increasing the sensitivity of the QRS detector by lowering the response level of the QRS comparator one-shot 16.

This peak follower output thus contains periodic sawtooth patterns that occur whenever the incoming signal from the QRS full wave rectifier adds an additional charge to the storage capacitor 72. This sawtooth pattern is removed by the low pass filtering action within the mean QRS smoother filter 36 that contains an R-C section consisting of a high impedance resistor 78 and a large capacitor 80 connected to ground. The resistor 78 is typically one megohm used with a relatively large capacitor of around 39 microfarads so that the low current flow charges the capacitor slowly. A diode 82 is connected in the reverse direction and parallel with the resistor 78 to provide a low impedance shunt path for discharging the capacitor 80 whenever its voltage is greater than that of the peak follower output, plus the diode threshold potential. Thus, if there is a sudden loss of signal level, such as if the patient moves to cause a change in the heart axis position, the voltage across the capacitor 80 can readily follow the gradual decline of the peak follower output and restore the normalized signal amplitude. The voltage across the capacitor 80 is applied to one input of an operational amplifier 84, the other input of which is connected to ground through an input resistor 86 and to the output through a feedback resistor 88. The value of the resistors 86 and 88, typically 10 kilohms and 22 kilohms, respectively, is selected to provide the desired DC amplification to achieve an appropriate scaling for the mean reference signal output to be delivered as a control signal to the AGC amplifier 10 and the tremor and wild swing comparators 46 and 54.

The AGC amplifier 10 employs a conventional automatic gain control arrangement wherein the ECG input is applied to a variable voltage divider consisting of an input resistor 90 and a variable impedance field effect transistor 92 having its source to drain path connected to ground. A selected proportion of the mean reference output from the mean QRS smoother filter 36 is applied to the base or control terminal of the field effect transistor 92 to regulate the resistance in the drain to source path, thus determining the porportion of the ECG input signal available at the common connection with the fixed input resistor 90. As the amplitude of the mean reference signal increases to indicate an increase in the QRS signal amplitude, the resistance of the field effect transistor 92 is decreased thereby making a lesser proportion of the ECG input signal available at the voltage divider common terminal output. This divided signal is applied through an AC coupling capacitor 98 to be developed across an input resistor 100 at one input terminal of an operational amplifier 102. The output of the operational amplifier 102 is developed across a voltage divider consisting of resistors 104 and 106 that provide an appropriate amount of feedback through a resistor 108 to the other amplifier output terminal. Typically the relative values of the feedback voltage divider resistors 94 and 96 are selected to provide a desired output signal amplitude of approximately one volt with slightly more than unity gain.

It should be obvious to those skilled in the art that the particular circuits employed in the system may be implemented using a variety of conventional circuit designs, or even a general or special purpose computer having standard analog-to-digital capabilities to accomplish the specific signal handling functions described and claimed herein. For this reason, the elements that make up the individual circuits are not specifically illustrated and described herein except to the extent necessary to assist in an understanding of certain operations in the overall system and detection techniques employed.

What is claimed is:

1. In a method for continuous analysis of an electrocardiographic signal to detect ventricular abnormalities, which method includes filtering said electrocardiographic signal to detect QRS signal components in the frequency range of about 10 to 20 Hertz, comparing said detected QRS signal components with a first threshold reference level for generating a gating signal indicative of the initiation of a QRS complex whenever the amplitude of the detected components exceeds that of the first threshold reference level, said gating signal having an interval corresponding to a selected succeeding portion of a QRS complex, further filtering said electrocardiographic signal to detect low frequency signal components below about 10 Hertz, integrating said low frequency signal components during said gating signal interval, and comparing said integrated components with a second threshold reference level for generating an output signal indicative of ventricular abnormalities when said integrated signal level exceeds said second threshold reference level, the improvement comprising:

further detecting the peak amplitude of the detected QRS signal components, and proportionally varying the amplitude of said first and second threshold reference levels to correspond with the peak amplitude of each preceding QRS complex, whereby the sensitivity of said detections is automatically adjusted in accordance with the amplitude of each successive QRS complex in the continuous electrocardiographic signal.

2. In the method of claim 1, the improvement further comprising:

amplifying an externally applied electrocardiographic wave with variable gain to provide said electrocardiographic signal for analysis at a normalized amplitude level; and, automatically regulating said variable gain in accordance with the mean signal level of the variable threshold reference levels of preceding QRS complexes.

3. In the method of claim 2, the improvement further comprising:

further filtering said electrocardiographic signal to detect higher frequency artifact noise and electrical power interference signal components in a range above about 25 Hertz:

integrating said higher frequency signal components during the interval between successive detections of QRS complexes to produce an integral noise signal level;

comparing said integral noise signal levels with said mean value of one of said variable threshold reference level to generate a standby output signal when said integral exceeds said mean signal level; and, interrupting said output signal indicative of ventricular abnormalities for a fixed interval of at least several successive QRS complexes in response to said standby output signal.

4. In the method of claim 2, the improvement further comprising:

rectifying a selectively attenuated proportion of said electrocardiographic signal to invert one polarity thereof;

continuously comparing the amplitude of the rectified signal with said mean signal level of one of said variable threshold reference levels to generate a standby output signal whenever the amplitude of said rectified signal exceeds said mean signal level; and, interrupting the output signal indicative of ventricular abnormalities in response to said standby output signal for a predetermined interval including at least several successive QRS complexes.

5. In a method of claim 2, the improvement further comprising:

further filtering said electrocardiographic signal to detect higher frequency artifact noise and electrical power interference signal components in the range above about 25 Hertz to produce an integrated output representative of the total higher frequency noise signal level during the interval between detections of successive QRS complexes;

rectifying a selectively attenuated proportion of said electrocardiographic signal to invert one polarity thereof; and, continuously comparing the amplitude of said integral and said rectified electrocardiographic signal with said mean signal level to generate a standby output signal whenever said integral or said rectified signal exceeds said mean signal level; and, interrupting the output signal indicative of ventricular abnormalities in response to said standby output signal for a predetermined interval extending over at least several QRS complexes.

6. In the method of claim 1, the improvement further comprising:

further filtering said electrocardiographic signal to detect higher frequency artifact noise and electrical power interference signal components in a range above about 25 Hertz;

integrating the total energy of said higher frequency signal components during the time between successive detections of QRS complexes to produce an integrated noise signal;

comparing the level of said integrated noise signal against a reference signal indicative of said variable threshold reference levels; and, interrupting said output signal indicative of ventricular abnormalities for a fixed interval extending over at least several successive QRS complexes in response to said standby output signal.

7. In the method of claim 1, the improvement further comprising:

rectifying a selectively attenuated proportion of said electrocardiographic signal to invert one polarity thereof;

continuously comparing the amplitude of the rectified signal with a reference signal indicative of said variable threshold reference levels to generate a standby output signal whenever the amplitude of said rectified signal exceeds said reference signal; and, interrupting the output signal indicative of ventricular abnormalities in response to said standby output signal for a predetermined interval including at least several successive QRS complexes.

8. The method of claim 1 wherein:

said threshold reference levels are generated with a predetermined limited rate of increase sufficient to reestablish said threshold reference levels during each QRS complex at an amplitude slightly above that established during the preceding QRS complex, and with a relatively slower constant rate of decrease during intervals between detections of successive QRS complexes, whereby the amplitude of said QRS level is controlled to prevent loss of detection sensitivity resulting from abnormally high amplitude noise signals and to increase detection sensivity at a constant rate during intervals between detections of QRS complexes.

9. In the method of claim 2 wherein the improvement further comprises:

generating a control signal indicative of said mean signal level by low pass filtering in one signal direction to smooth out the periodic sawtooth signal pattern resulting from increases in said variable threshold reference levels upon detection of each QRS complex and by shunting said low pass filtering in the opposite signal direction so that the control signal is capable of decreasing at a rate equal to that of said variable threshold reference levels.

10. In a method for continuous analysis of an electrocardiographic signal to detect ventricular abnormalities, which method includes filtering said electrocardiographic signal to detect QRS signal components in the frequency range of about 10 to 20 Hertz, comparing said detected QRS signal components with a first threshold reference level for generating a gating signal indicative of the initiation of a QRS complex whenever the amplitude of the detected components exceeds that of the first threshold reference level, said gating signal having an interval corresponding to a selected succeeding portion of a QRS complex, further filtering said electrocardiographic signal to detect low frequency signal components below about 10 Hertz, integrating said low frequency signal components during said gating signal interval, and comparing said integrated components with a second threshold reference level for generating an output signal indicative of ventricular abnormalities when said integrated signal level exceeds said threshold reference level, the improvement comprising:

further filtering said electrocardiographic signal to detect higher frequency artifact noise and electrical power interference signal components in a range above about 25 Hertz;

successively and separately integrating said higher frequency signal components during each interval between successive detections of QRS complexes to produce an integrated output indicative of the total high frequency noise signal energy present throughout each such interval;

comparing the level of each said integrated output with a variable threshold reference level to generate a standby output signal whenever said integral exceeds said variable threshold reference level;

and, interrupting said output signal indicative of ventricular abnormalities in response to said standby output signal for a predetermined time interval extending over at least several successive QRS complexes.

11. In the method of claim 10, the improvement further comprising:

rectifying a selectively attenuated proportion of said electrocardiographic signal to invert one polarity thereof;

continuously comparing the amplitude of the rectified signal with said reference variable level to generate said standby output signal whenever the amplitude of said rectified signal exceeds said variable reference level.

12. In a method for continuous analysis of an electrocardiographic signal to detect ventricular abnormalities, which method includes filtering said electrocardiographic signal to detect QRS signal components in the frequency range of about 10 to 20 Hertz, comparing said detected QRS signal components with a first threshold reference level for generating a gating signal indicative of the initiation of a QRS complex whenever the amplitude of the detected components exceeds that of the first threshold reference level, said gating signal having an interval corresponding to a selected succeeding portion of a QRS complex, further filtering said electrocardiographic signal to detect low frequency signal components below about 10 Hertz, integrating said low frequency signal components during said gating signal interval, and comparing said integrated components with a second threshold reference level for generating an output signal indicative of ventricular abnormalities when said integrated signal level exceeds said threshold reference level, the improvement comprising:

further detecting the peak amplitude of the detected QRS signal components for generating a gain control signal in accordance with the amplitude of preceding QRS complexes; and, amplifying an externally applied electrocardiographic wave signal with a gain automatically variable in response to said gain control signal for providing said electrocardiographic signal for analysis at a substantially constant normalized amplitude.

13. In a system for detecting ventricular arrhythmias and abnormalities in a continuous electrocardiographic signal including a band pass filter for detecting QRS signal components in the frequency range of about 10 to 20 Hertz, a comparator for generating a gating signal whenever the filtered QRS signal components from the band pass filter exceed a threshold reference level, a low pass filter for detecting low frequency signal components below about 10 Hertz, a rectifier for inverting one polarity of said low frequency signal components, and an integrator operative in response to said gating signal for generating an integrated output signal with the level corresponding to the low frequency energy content of said electrocardiographic signal during said gating interval, the improvement comprising:

an automatic gain control amplifier means operative in response to the peak amplitude of the filtered QRS components for adjusting the amplitude of said electrocardiographic signal to maintain the peak amplitude of the incoming QRS signal components applied to said band pass filter at a predetermined substantially constant level to be applied to said band pass and low pass filters.

14. The system of claim 13 wherein said automatic gain control means comprises:

a peak follower circuit coupled to receive the output from said band pass filter to generate a threshold reference signal corresponding to the peak amplitude of the output from the band pass filter during each QRS complex;

a smoother filter circuit for producing a mean reference signal corresponding to a time average of said threshold reference signal to eliminate sawtooth signal patterns due to increases in the signal due to periodic increases in the peak follower output; and, an automatic gain control amplifier responsive to said mean reference signal for varying the gain in a manner inversely proportional to the amplitude of said mean reference signal.

15. The system of claim 14 wherein:

means coupled to said peak follower circuit for applying a predetermined proportion of the threshold reference signal from said peak follower circuit as the threshold reference level to said comparator to be compared against the amplitude of said filtered QRS signal components.

16. The system of claim 15 further comprising:

a VA comparator means coupled to said integrator and said peak follower circuit for generating an output signal indicative of a ventricular abnormality whenever said integrated output signal applied from the integrator exceeds the level of said threshold reference signal.

17. The system of claim 16 wherein:

said comparator for generating a gating signal includes a comparator circuit for generating an output signal whenever the filtered QRS signal components from the band pass filter exceed a threshold reference level, and a gating signal circuit responsive to said gating output signal from the comparator circuit to generate said gating signal with approximately 150 milliseconds duration beginning after a delay of approximately 50 milliseconds from the initiation of said comparator output.

18. The system of claim 14 wherein:

said peak follower circuit includes an output capacitor that is charged at a predetermined limited rate to provide a peak voltage corresponding to the peak amplitude of the output from the band pass filter during each QRS complex and having a high impedance means for discharging the voltage on said capacitor to decrease said threshold reference signal at a constant much slower rate during the interval between successive outputs from said band pass filter.

19. The system of claim 18 wherein:

said smoother filter circuit includes a resistor and capacitor elements for slowly adding charge to said capacitor element to increase said mean reference signal and including a unidirectional device connected in shunt with the resistor element to permit discharge of said capacitor element at a rate corresponding to the rate of decrease in the amplitude of said threshold reference signal.

20. The system of claim 14 further comprising:

a high pass filter for detecting high frequency artifact and interference signal components above about 25 Hertz;

a full wave rectifier for inverting one polarity of said high frequency signal components detected by said high pass filter;

a second integrator operative in response to the gating signal output from said comparator circuit to integrate the total energy content of said high frequency signal components during the interval between successive QRS complexes appearing in said electrocardiographic signal; and, an artifact comparator circuit for receiving said said mean reference signal from said smoother filter circuit to generate a standby output pulse of a predetermined duration extending over at least two QRS complexes to be used in interrupting outputs from said integrator indicative of ventricular abnormalities whenever the output level of said second integrator exceeds that of said mean reference signal.

21. The system of claim 14 further comprising:

a full wave rectifier for inverting one polarity of a selectively attenuating version of said electrocardiographic signal; and, an artifact comparator circuit for receiving said mean reference signal from said smoother filter circuit to generate a standby output pulse of a predetermined duration extending over at least two QRS complex intervals to be used in interrupting outputs from said integrator indicative of ventricular abnormalities whenever the output level of said full wave rectifier exceeds that said mean reference signal.

* * * * *